United States Patent
Rausch

[11] 3,747,442
[45] July 24, 1973

[54] CHUCKS
[75] Inventor: Paul Gilger Rausch, Cleveland, Ohio
[73] Assignee: Celtite, Inc., Cleveland, Ohio
[22] Filed: July 27, 1971
[21] Appl. No.: 166,544

[52] U.S. Cl. ............................................. 81/53.2
[51] Int. Cl. ........................................ B25b 13/50
[58] Field of Search ................... 81/53.2, 60, 61

[56] References Cited
UNITED STATES PATENTS
| 531,577 | 12/1894 | Teal | 81/53.2 |
| 2,982,161 | 5/1961 | Angquist et al. | 81/60 X |
| 2,516,394 | 7/1950 | Keiser | 81/53.2 |

FOREIGN PATENTS OR APPLICATIONS
| 39,434 | 8/1934 | France | 81/53.2 |
| 506,748 | 6/1939 | Great Britain | 81/53.2 |

*Primary Examiner*—James L. Jones, Jr.
*Attorney*—Wolfe, Hubbard, Leydig, Voit & Osann, Ltd.

[57] ABSTRACT

A chuck for driving bolts into holes with rotation consists of an outer tubular casing and resiliently mounted jaws therein, such that on turning the casing in one sense the jaws grip and turn any bolt which they surround.

1 Claim, 1 Drawing Figure

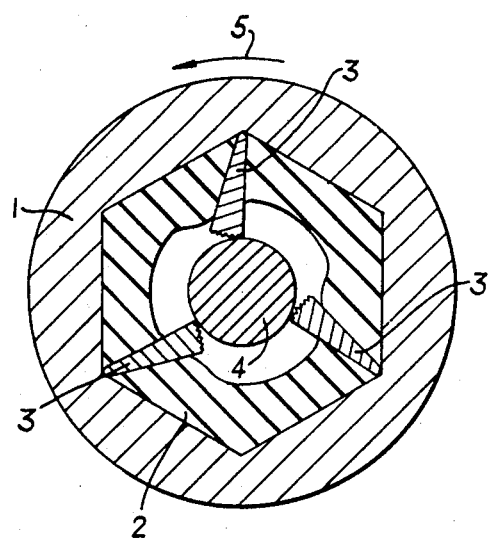

CHUCKS

GENERAL FIELD OF THE INVENTION

This invention relates to chucks, and particularly to a quick engage chuck for driving bolts rotateably while inserting them into holes.

GENERAL DESCRIPTION OF PRIOR ART

In recent years, the practice has arisen of securing bolts in rock faces, masonry and the like by the use of a setting resin system. In this system, a blind hole is first bored in the substrate in question and then a cartridge containing, separately, a resin and a hardener therefor is placed in the hole. Thereafter, the bolt is inserted into the hole while being rotated: the rotation and insertion causes the cartridge to fracture, and the contents to mix and form a setting resin mixture, which hardens in a short while to set the bolt firmly in the hole. Naturally, the term bolt in this connexion refers merely to a generally rod-shaped member for insertion in the hole, which bolt may or may not be threaded. Generally, the bolt is provided on its outer surface with some sort of ribbing or other surface deformation to give a mechanical key to the resin. The end of the bolt which protrudes from the hole after fixing may be threaded or otherwise provided with means onto which fixture may be made, e.g., for the purpose of attaching a structure to the face of the wall in which the holes are bored.

One difficulty in the above process is that of rotating the bolt while inserting it into the hole. One method is to fix the end of the bolt into a conventional 3-jaw drill chuck on a suitable speed drill, and then "drill" the bolt into the hole. This method is time consuming, and has the disadvantage that damage to the bolt end may result if the drill chuck is overtightened. In particular the steps of fixing the bolt in the chuck and then, after insertion of the bolt into the hole, removing the chuck from the bolt end, are time consuming and inconvenient. Further disadvantages with many chucks are that they are complex and expensive, inconveniently large in size, and that they tend to become jammed in use with dirt or rock dust.

OBJECTS OF THIS INVENTION

It is accordingly one object of the present invention to provide a drill chuck of improved design for use in the process above.

It is a further object of the invention to provide a chuck which is quickly and easily applied to a bolt, and, after drilling, quickly and easily removed therefrom.

It is a further object of this invention to provide a chuck of mechanical simplicity with few moving parts to clog or break.

It is a further object of this invention to produce such a chuck which is inexpensive to manufacture, and which is of convenient size.

GENERAL DESCRIPTION OF THE INVENTION

These and other objects are achieved by my novel chuck which consists essentially of a hollow tubular casing having at least 3 equally peripherally spaced jaws extending axially inside the casing, each jaw being rotateable about an axis parallel to the axis of the casing and adjacent the side thereof, the radially inner end of each jaw having a gripping surface, and the jaws being resiliently biased to a position in which the radially inner ends of the jaws line on a circle of size intermediate the minimum and maximum size of the circles able to be defined by the ends of the jaws when rotated.

Thus, at rest, the jaws are biased to define a circle of certain diameter. On inserting a bolt of larger diameter, the jaws are rotated to increase the diameter of the circle of their ends, each jaw being biased into engagement with the bolt. It will now be possible to turn the bolt in the jaw in one sense but not in the other. In the second case, the gripping surfaces of the jaws will engage the bolt and hold it firmly. Thus, by rotating the chuck in one sense, the bolt may be driven in that sense, though not in the other sense.

Only light biasing of the jaws is needed, and this enables the bolt to be inserted quickly and easily in the chuck, and as quickly and easily removed. Indeed, once a bolt has been drilled into a resin-filled cavity using the chuck, the chuck may simply be pulled away, leaving the bolt, unharmed, in situ.

The preferred mode of mounting the jaws of the chuck is to set them in an annular layer of rubber or rubbery plastics material around the inside of the tubular casing. The inside of the casing may be polygonal in section, some of the corners of the polygon acting as pivot lines for the jaws.

It will be appreciated that the chuck can be used for other turning operations, e.g., inserting or removing threaded studs in the automotive and other industries, and for activating fixed position stirring rods in liquid tanks.

SPECIFIC DESCRIPTION OF THE DRAWINGS

By way of example, the accompanying drawing shows a transverse section through a chuck of the present invention, in use in driving a bolt into a hole.

Referring to the drawing, the chuck consists of a tubular housing 1, closed at one end and having, at one end, an axial spigot for connexion to a suitable rotary drive, e.g., for fixing in a conventional 3-jaw chuck in an electric drill. The interior of housing 1 is of hexagonal cross-section and is lined with a layer or rubber 2 in which are set three hardened steel jaws 3. The radially inner ends of jaws 3 are grooved for better grip.

In use a bolt 4 is press fitted between jaws 3 as shown. Rotation of the chuck in the direction of arrow 5 will cause bolt 4 to be driven. On the cessation of driving the chuck can normally be removed without difficulty directly, or if not, after a few degrees rotation of the chuck in a direction opposite to that of arrow 5.

It will be understood that, for driving a wide range of sizes of bolts, different sized chucks may be used. However, with good jaw design, it is possible to reduce the number of chucks needed for bolts of 3 mm to 30 mm diameter to a low figure.

I claim:
1. A chuck comprising:
   A. a hollow tubular casing,
      i. the inner periphery of the casing being hexagonal in cross section,
   B. three equally peripherally spaced jaws extending axially inside the casing,
      i. the radially outer ends of each jaw contacting alternate corners of said hexagonal periphery,
      ii. each jaw thereby being rotatable about an axis parallel to the axis of the casing and adjacent the side thereof, iii. the radially inner end of each jaw having a gripping surface,
C. and an annular layer of natural rubber or synthetic rubbery plastics material about the inner periphery of the tubular casing,
  i. said jaws being set in said material,
  ii. and the material thereby resiliently biasing said jaws in a position in which the radially inner ends of the jaws line on a circle of sizes intermediate the minimum and maximum size of the circles able to be defined by the ends of the jaws when rotated.

* * * * *